(12) United States Patent
Huegerich et al.

(10) Patent No.: US 11,485,432 B2
(45) Date of Patent: Nov. 1, 2022

(54) ATTACHMENT ASSEMBLY FOR USE WITH A WORK MACHINE

(71) Applicant: DEERE & COMPANY, Moline, IL (US)

(72) Inventors: Tony J. Huegerich, Cedar Falls, IA (US); Christopher L. Bradshaw, Sherrard, IL (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 17/204,051

(22) Filed: Mar. 17, 2021

(65) Prior Publication Data
US 2021/0197906 A1 Jul. 1, 2021

Related U.S. Application Data

(62) Division of application No. 15/799,248, filed on Oct. 31, 2017, now Pat. No. 11,027,787.

(51) Int. Cl.
*B62D 49/08* (2006.01)
*B62D 49/06* (2006.01)
(Continued)

(52) U.S. Cl.
CPC .............. *B62D 49/085* (2013.01); *B60R 9/06* (2013.01); *B62D 49/065* (2013.01);
(Continued)

(58) Field of Classification Search
CPC ........................... B62D 49/085; B62D 49/065; B62D 49/0628; B60R 9/06; B66C 23/74; E02F 9/18
See application file for complete search history.

(56) References Cited

U.S. PATENT DOCUMENTS 2,797,121 A 6/1957 Aud
3,595,410 A 7/1971 Lemmon
(Continued)

FOREIGN PATENT DOCUMENTS

DE 2512721 A 9/1976
DE 2914125 A * 10/1980 ........... A01B 59/064
(Continued)

OTHER PUBLICATIONS

Forage Harvester photograph, publicly available before Aug. 2017, 1 page.
(Continued)

*Primary Examiner* — Eret C McNichols

(57) ABSTRACT

An attachment assembly for use with a work machine includes an attachment adapter coupled to the work machine and fixed relative thereto and an attachment frame including a member defining an attachment point configured to engage, into an engaged mode, with the attachment adapter when a front suspension system of the work machine is raised to a raised position, and configured to disengage, into a disengaged mode, from the attachment adapter when the front suspension system is lowered to a lowered position, the attachment adapter configured to travel with the work machine when in the engaged mode and the disengaged mode, and the attachment frame configured to travel with the work machine when in only the engaged mode.

17 Claims, 10 Drawing Sheets

(51) Int. Cl.
  *B60R 9/06* (2006.01)
  *B66C 23/74* (2006.01)
  *E02F 9/18* (2006.01)

(52) U.S. Cl.
  CPC .......... *B62D 49/0628* (2013.01); *B66C 23/74* (2013.01); *E02F 9/18* (2013.01)

(56) References Cited

U.S. PATENT DOCUMENTS

| | | | |
|---|---|---|---|
| 3,635,493 A | 1/1972 | Barth et al. | |
| 3,730,545 A | 5/1973 | Allori | |
| 3,758,132 A | 9/1973 | Elfes et al. | |
| 3,888,507 A | 6/1975 | Berghausen | |
| 3,944,252 A | 3/1976 | Barth | |
| 3,991,891 A | 11/1976 | Cox | |
| 4,094,534 A | 6/1978 | Welke et al. | |
| 4,377,300 A * | 3/1983 | Old | B62D 49/085 280/758 |
| 4,537,423 A | 8/1985 | Nau et al. | |
| 4,659,102 A | 4/1987 | Stuhrmann et al. | |
| 4,899,831 A | 2/1990 | Schillings et al. | |
| 5,219,180 A * | 6/1993 | Zipser | B62D 49/085 280/759 |
| 5,462,309 A | 10/1995 | Jeffers et al. | |
| 5,690,360 A | 11/1997 | Teich | |
| 6,035,941 A | 3/2000 | Hirooka et al. | |
| 6,227,304 B1 | 5/2001 | Schlegel | |
| 6,371,217 B1 | 4/2002 | Boden | |
| 6,431,288 B1 | 8/2002 | Hoffart | |
| 6,471,245 B1 | 10/2002 | Schott | |
| 6,830,112 B2 | 12/2004 | Pierce | |
| 7,513,529 B2 | 4/2009 | Defrancq | |
| 7,600,574 B2 | 10/2009 | Chauvel | |
| 8,083,111 B2 * | 12/2011 | Base | B60R 9/065 224/400 |
| 8,408,325 B2 | 4/2013 | Kapfer | |
| 8,419,064 B2 * | 4/2013 | Erhardt | B62D 49/0628 224/521 |
| 8,496,070 B2 | 7/2013 | Kollath | |
| 8,662,460 B2 | 3/2014 | Heimbuch et al. | |
| 8,672,048 B2 | 3/2014 | Crumpler, Jr. | |
| 8,925,964 B1 | 1/2015 | Duppong et al. | |
| 9,139,059 B1 | 9/2015 | Kringstad et al. | |
| 9,180,820 B2 * | 11/2015 | Klein | B62D 49/085 |
| 9,663,158 B2 | 5/2017 | Jutz et al. | |
| 2006/0103125 A1 | 5/2006 | Yamamoto | |
| 2008/0129028 A1 | 6/2008 | Hamm et al. | |
| 2010/0236955 A1 * | 9/2010 | Base | B60R 11/06 224/400 |
| 2010/0300778 A1 * | 12/2010 | Miyazaki | E02F 3/3631 180/53.3 |
| 2012/0138756 A1 | 6/2012 | Heimbuch et al. | |
| 2015/0060508 A1 * | 3/2015 | Klein | F16M 13/02 224/545 |
| 2015/0097362 A1 | 4/2015 | Jutz et al. | |
| 2017/0021690 A1 | 1/2017 | Miller et al. | |

FOREIGN PATENT DOCUMENTS

| | | | | |
|---|---|---|---|---|
| DE | 2914125 A1 | | 10/1980 | |
| DE | 3140871 A1 | | 4/1983 | |
| DE | 3140871 A1 | * | 4/1983 | |
| EP | 0126919 B1 | | 11/1986 | |
| EP | 0126263 B1 | | 12/1986 | |
| EP | 0083146 B1 | | 5/1987 | |
| EP | 0274853 A1 | | 7/1988 | |
| EP | 1619111 A1 | * | 1/2006 | ........... A01B 59/062 |
| EP | 1842412 A1 | | 10/2007 | |
| EP | 2226213 A2 | | 9/2010 | |
| EP | 2441651 A2 | | 4/2012 | |
| EP | 2457428 B1 | | 7/2013 | |
| EP | 2225925 B1 | | 11/2013 | |
| ES | 2207416 A1 | * | 5/2004 | ............. B62D 37/04 |
| FR | 1529278 A | | 6/1968 | |
| FR | 1529278 A | * | 6/1968 | |
| FR | 2406562 A1 | * | 5/1979 | |
| FR | 2406562 A1 | | 5/1979 | |
| FR | 2437340 A1 | | 4/1980 | |
| FR | 2437340 A1 | * | 4/1980 | |
| FR | 2607352 A1 | * | 6/1988 | |
| FR | 2607352 A1 | | 6/1988 | |
| FR | 2848978 A1 | * | 6/2004 | ............. B62D 37/04 |
| FR | 2848978 A1 | | 6/2004 | |
| GB | 1149686 A | * | 4/1969 | |
| GB | 1149686 A | | 4/1969 | |
| GB | 2053649 A | * | 2/1981 | ............... B60D 1/02 |
| GB | 2053649 A | | 2/1981 | |
| GB | 2423510 A | | 8/2006 | |
| GB | 2423510 A | * | 8/2006 | ........... B62D 49/085 |
| WO | WO7901026 A | | 11/1979 | |
| WO | WO2004043771 A1 | | 5/2004 | |
| WO | WO2015099623 A1 | | 7/2015 | |

OTHER PUBLICATIONS

Forest Harvester photograph, publicly available before Aug. 2017, 1 page.
Forage Harvester photograph, Easy attachment and automatic pickup recognition, publicly available before Aug. 2017, 1 page.
Screenshots from the video: Fendt 311 Vario front weight; sjoerdharbers; 2012; URL: https://www.youtube.comwatch?v=CLUktzvgYhc, published on: Apr. 20, 2012 [retrieved on Aug. 6, 2019].
Adapter plates; Fiedler Maschinenbau GmbH; 2017; URL: http://fiedler-maschinenbau.de/prospekte Sonstiges_Sonderloesungen//Adapterplatten.pdf, archived in http://www.archive.org on Mar. 5, 2017 [accessed on Aug. 6, 2019].
Counterweight; Röcker Metalltechnik; 2017; URL: https://www.roecker-metall.de, archived in http://www.archive.org on Oct. 6, 2017 [accessed on Aug. 7, 2019].
Screenshots from the video: Fendt with Röcker front weight; lissy1971ify; 2013; URL: https://www.youtube.com/watch?v=ycMmqXD9KK8, published on Apr. 30, 2013 [retrieved on Aug. 7, 2019].
Fendt, URL: http://www.fendt.com/us/pdf/fendt_900_vario_brochure__ft07181_.pdf.
German Search Report issued in counterpart application No. 102018216416.9 dated Aug. 8, 2019. (7 pages).

* cited by examiner

ATTACHMENT ASSEMBLY FOR USE WITH A WORK MACHINE

CROSS-REFERENCE TO RELATED APPLICATIONS

This patent application is a divisional of U.S. patent application Ser. No. 15/799,248, filed Oct. 31, 2017, which is hereby incorporated by reference.

FIELD OF THE DISCLOSURE

The present disclosure relates to an attachment assembly for use with a work machine.

BACKGROUND OF THE DISCLOSURE

Some work machines include hydraulically rotatable front hitches, and such hitches are a popular accessory in Europe. European operators may justify the added expense of a hydraulically rotatable front hitch, as it aids in adding and removing front "massive weights." Due to higher energy prices in Europe, strategically adding and removing the massive weight may provide substantial fuel and cost savings. Outside of Europe, there is interest in using massive weights and other front attachments. However, lower energy prices, outside of Europe, may make it harder to justify the initial investment associated with hydraulically rotatable front hitches.

SUMMARY OF THE DISCLOSURE

Disclosed is an attachment assembly for use with a work machine. The attachment assembly includes an attachment adapter and an attachment frame. The attachment adapter is coupled to the work machine and fixed relative thereto. The attachment frame includes a member that defines an attachment point. The attachment point engages, into an engaged mode, with the attachment adapter when a front suspension system of the work machine is raised to a raised position. The attachment point disengages, into a disengaged mode, from the attachment adapter when the front suspension system is lowered to a lowered position. The attachment adapter travels with the work machine when in the engaged mode and also in the disengaged mode. The attachment frame travels with the work machine only when in the engaged mode.

BRIEF DESCRIPTION OF THE DRAWINGS

The detailed description of the drawings refers to the accompanying figures in which.

Like reference numerals in the various drawings indicate like elements.

DETAILED DESCRIPTION OF THE DRAWINGS

Figure 1:
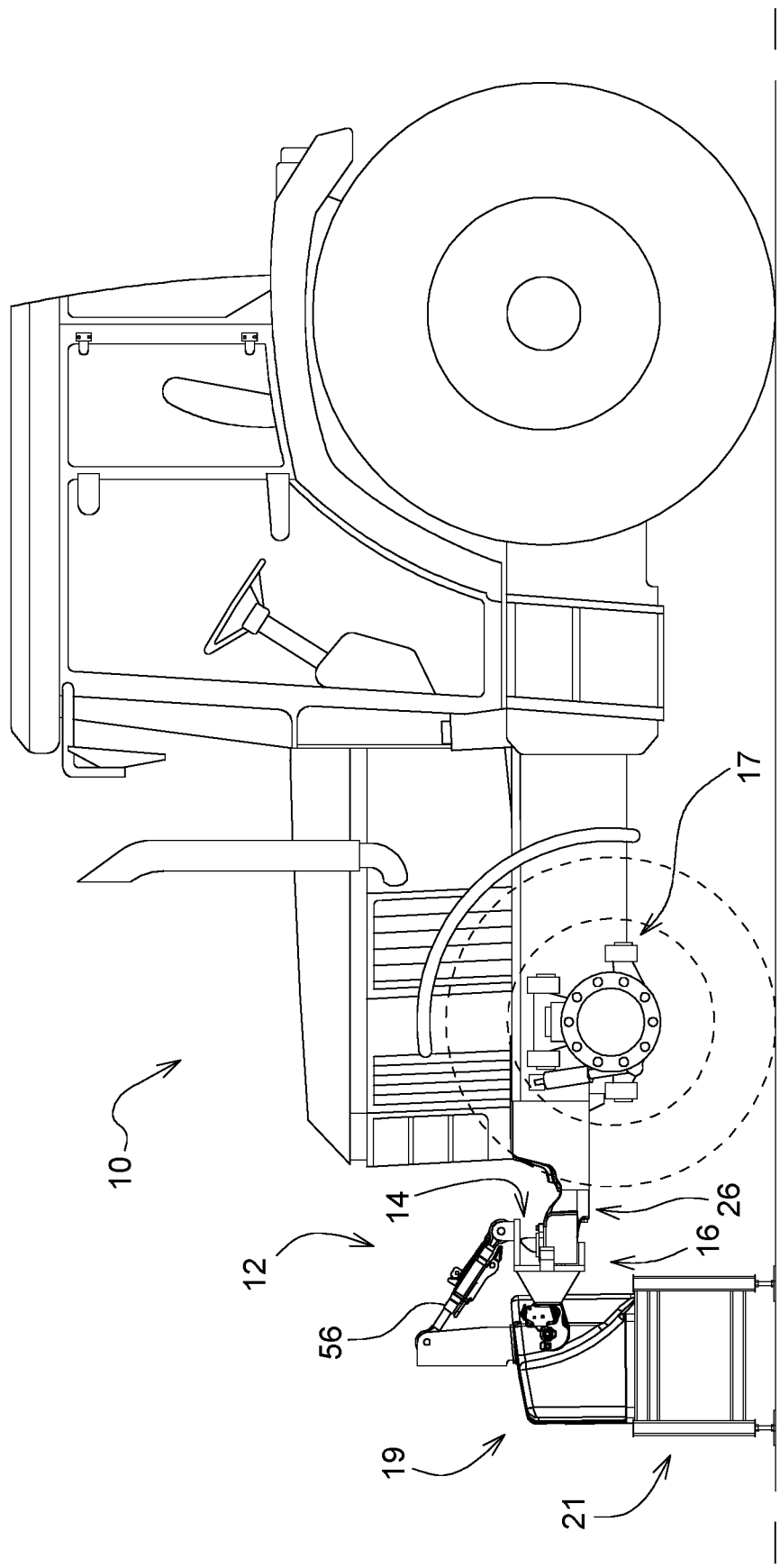
FIG. 1. is a left side view of a work machine and an example of an attachment assembly, a portion of which is shown in cutaway.
Figure 2:
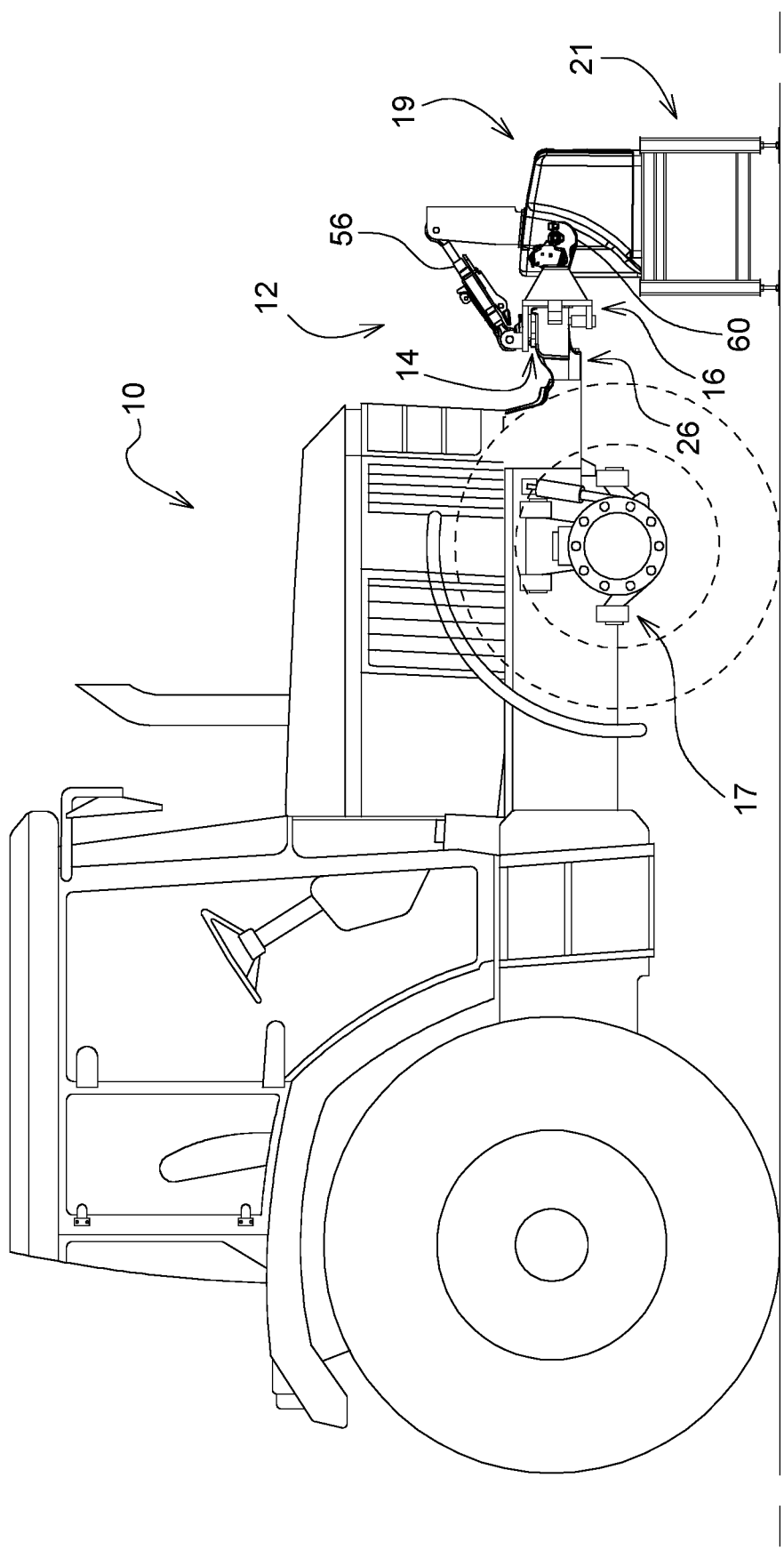
FIG. 2 is a right side view of the work machine and the attachment assembly, a portion of which is shown in cutaway.
Figure 3:
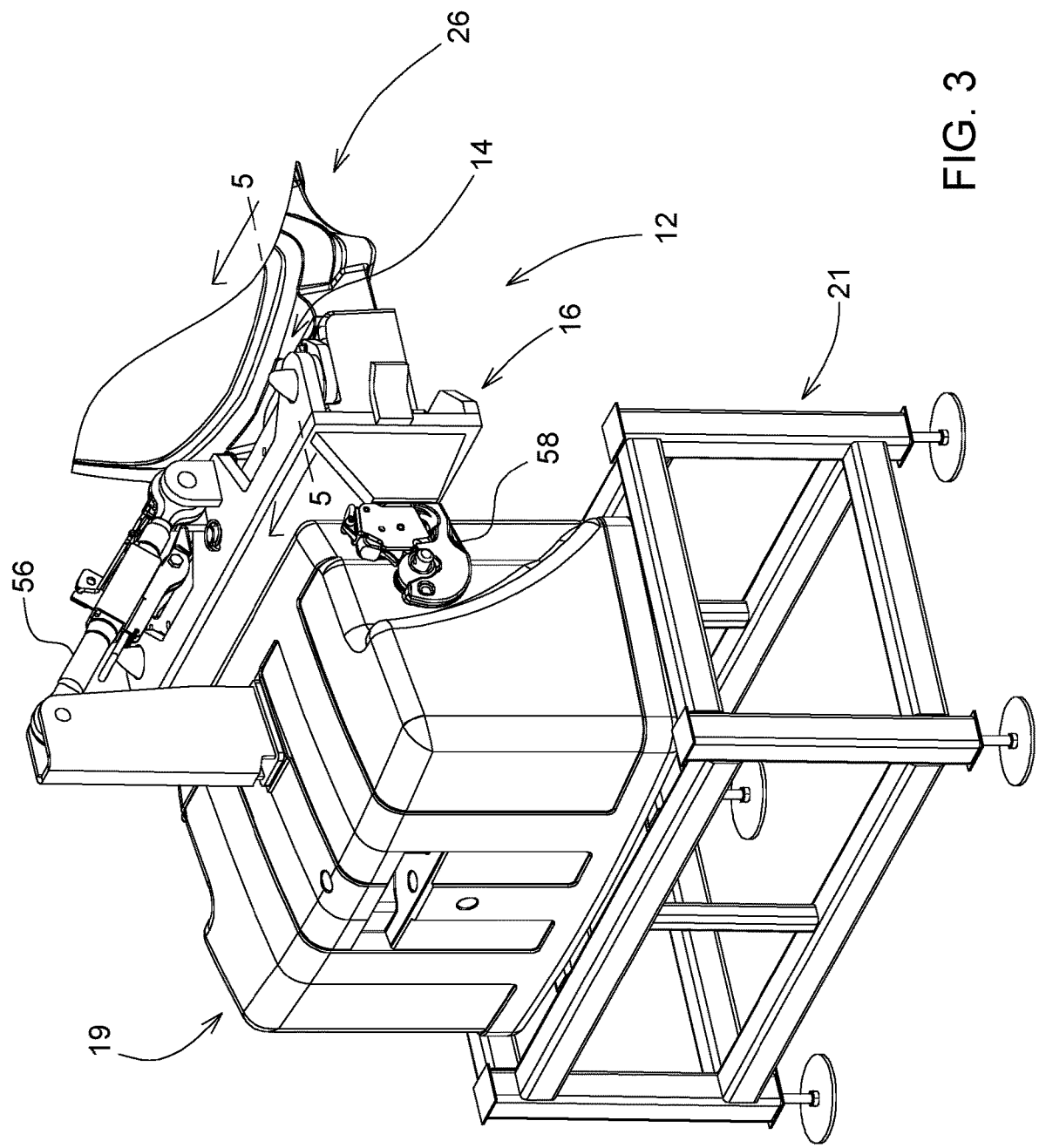
FIG. 3 is perspective view of the attachment assembly, an attachment, and a support stand.

Referring to FIGS. 1-3, there is shown a work machine 10 with an attachment assembly 12. The work machine 10 may be an agricultural tractor, a construction machine, or a similar kind of machine. The attachment assembly 12 includes an attachment adapter 14 and an attachment frame 16. The attachment adapter 14 is coupled to the work machine 10 and is fixed relative thereto, meaning that the attachment adapter 14, in some embodiments, may only be raised and lowered via raising and lowering the front suspension system 17 of the work machine 10. One example of a front suspension system 17 of a work machine 10 is the Independent Link Suspension of an 8000 Series John Deere Tractor.

In some embodiments, the attachment adapter 14 may be coupled to a support frame 26 of the work machine 10 (i.e., the attachment adapter 14 and the support frame 26 are physically distinct components). In other embodiments, the attachment adapter 14 and the support frame 26 may be molded together as a unitary casting.

In some operating modes, the work machine 10 may automatically adjust the front suspension system 17, so as to provide a smooth ride for operator of the work machine 10. In other operating modes, the front suspension system 17 may be raised and lowered via a touch screen display in the operator station of the work machine 10. For example, the display may provide an up button to raise the front suspension system 17, and a down button to lower the front suspension system 17. This freedom to raise and lower the front suspension system 17 may be used for adjusting the ride of the work machine 10 or for troubleshooting procedures. The vertical distance between a raised and lowered position of the front suspension system 17 may be, for example, in the range of 100 mm in some embodiments to 250 mm in others. Moving between these positions may take several seconds (e.g., 10 seconds).

The attachment adapter 14 travels with the work machine 10 when in the engaged mode and also in the disengaged mode. In some embodiments, the attachment adapter 14 may only be raised and lowered via movement of the front suspension system 17. The attachment frame 16 travels with the work machine 10 when in the engaged mode, but does not travel with the work machine 10 when in the disengaged mode.

As shown in FIGS. 1-2, the attachment frame 16 may include an upper link 56, a bottom left link 58, and a bottom right link 60. As illustrated, the upper link 56 may be rotatably coupled to the top horizontal member 36, while the bottom left link 58 and the bottom right link 60 may be rigidly coupled to the vertical member 38.

The attachment frame 16 may be coupled a rock box, a tool box, a sprayer, a mower, or some other kind of front attachment for a work machine 10. As illustrated, the attachment frame 16 may also be coupled to a weight 19, and the weight 19 may be raised off of the ground via a support stand 21. The attachment frame 16 may be permanently mounted or semi-permanently mounted (e.g., via the upper link 56, the bottom left link 58, and the bottom right link 60) to the front attachment.

The weight 19 may be a set of suitcase weights or, as shown in FIGS. 1-3, a massive weight. During some operations (e.g., field work), using the weight 19 may aid in reducing unnecessary wheel spin and corresponding unnecessary fuel use. During other operations (e.g., transport), removing the weight 19 may aid in reducing the overall weight of the work machine 10, and thus aid in reducing unnecessary fuel use. In response, some operators regularly make ballast adjustments via adding and removing the weight 19. Being able to do this via the front suspension system 17 may make the operator more efficient. For example, using the front suspension system 17 may negate the need for the operator to add and remove suitcase weights to the work machine 10. In addition, using the front suspension system 17 negates the need for purchasing a hydraulically rotatable front hitch, as would traditionally be required to add and remove a massive weight (e.g., one that weighs 1800 kg).

Figure 4:
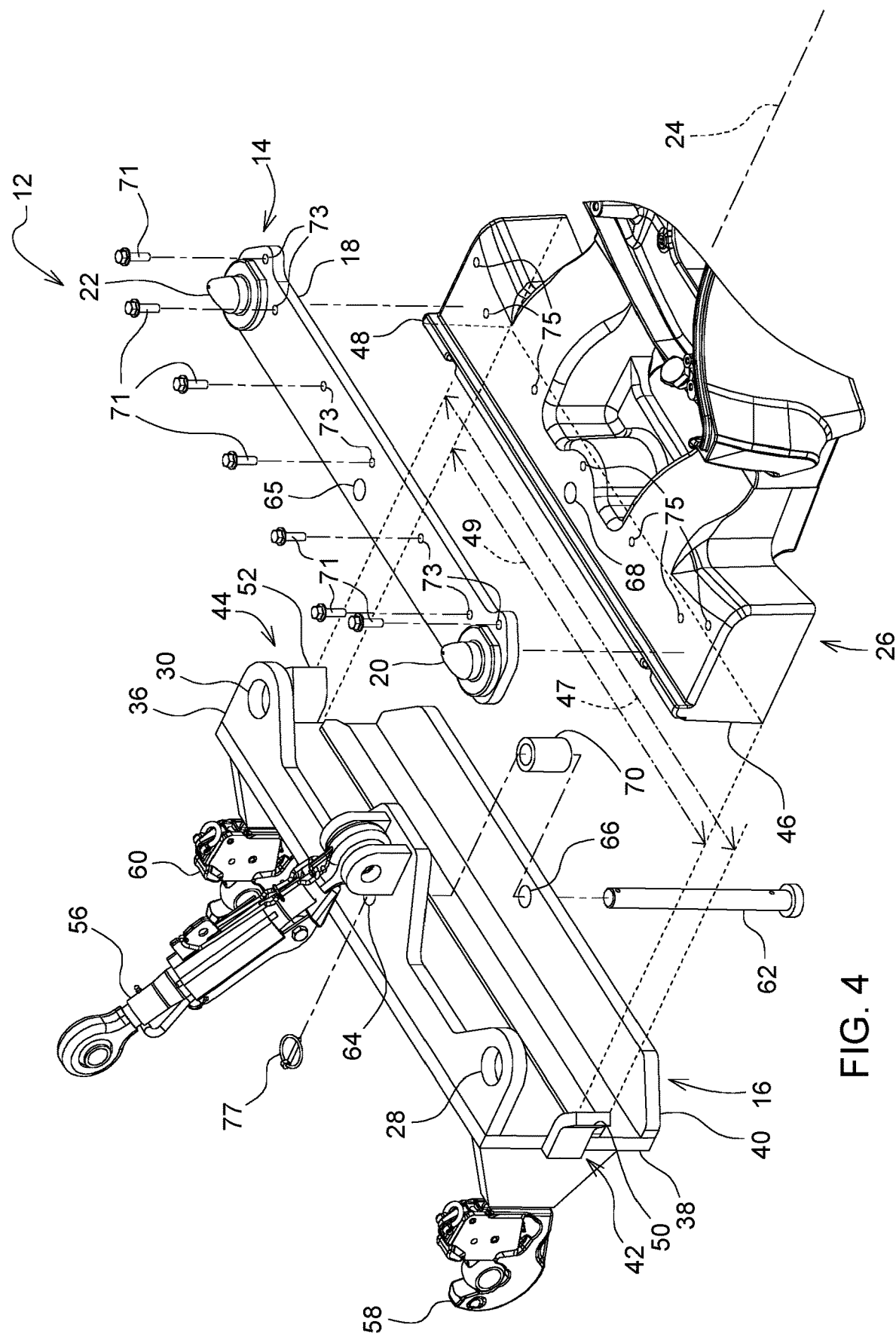
FIG. 4 is an exploded perspective view of the attachment assembly.
Figure 5:
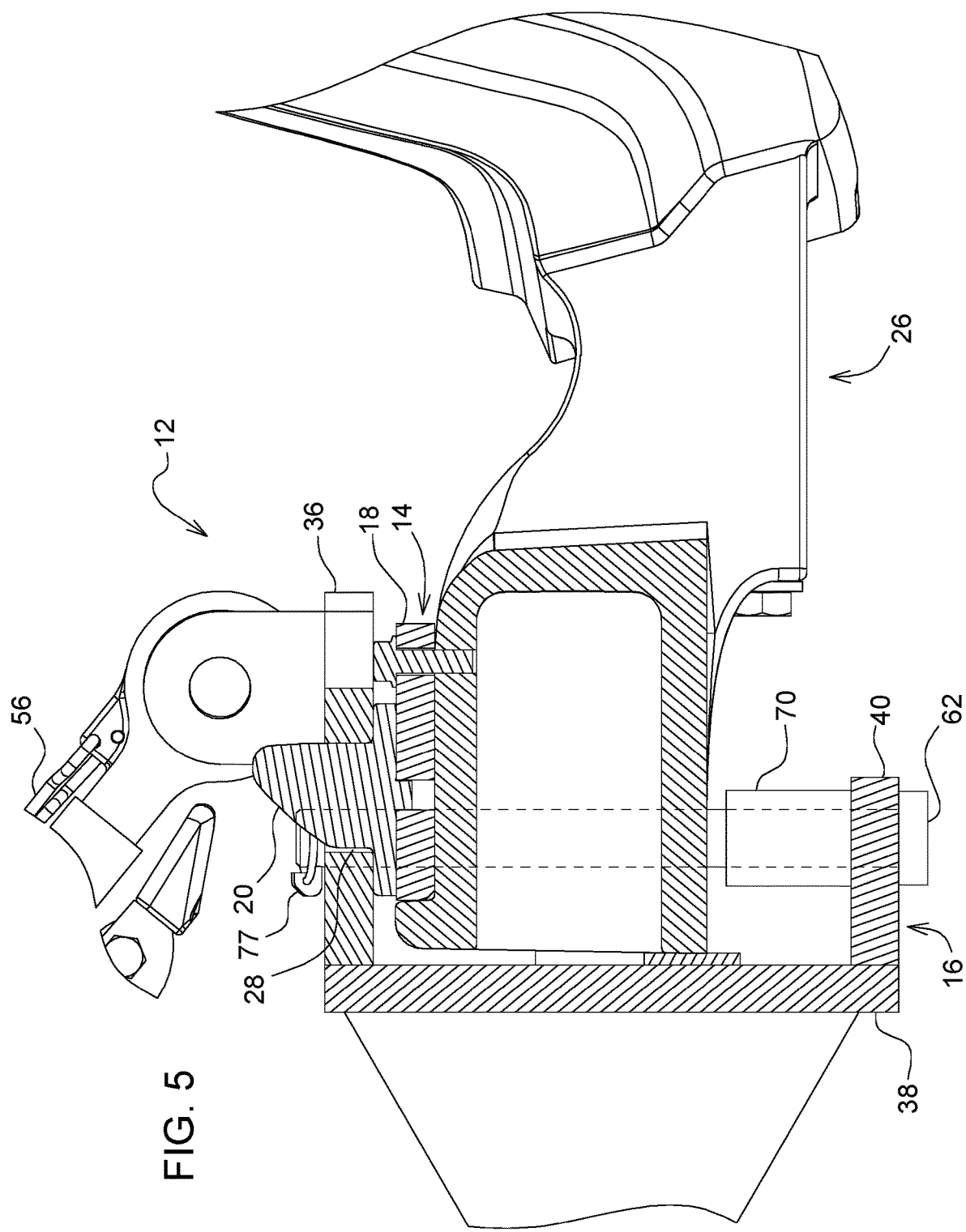
FIG. 5 is a sectional view of the attachment assembly and a support frame taken along lines 5-5 of FIG. 3.

As shown in FIGS. 4-5, the attachment adapter 14 may include a longitudinal horizontal plate 18, a first upwardly projecting member 20, and a second upwardly projecting member 22. The longitudinal horizontal plate 18 may be orientated laterally with respect to a fore-and-aft axis 24 defined by the work machine 10. The attachment adapter 14 may be coupled to the support frame 26 via a plurality of fasteners 71, such that the bottom surface of the longitudinal horizontal plate 18 is in contact with a top surface of the support frame 26 of the work machine 10. The fasteners 71 may be positioned in a plurality of apertures 73 of the attachment adapter 14, and in a plurality of apertures 75 of the support frame 26. The apertures 75 may be threaded apertures.

The first upwardly projecting member 20 may be positioned on a top surface of the longitudinal horizontal plate 18, so as to engage with the first attachment point 28 when in the engaged mode. Similarly, the second upwardly projecting member 22 may be positioned on a top surface of the longitudinal horizontal plate 18, so as to engage with the second attachment point 30 when in the engaged mode.

The attachment frame 16 may include a top horizontal member 36, a vertical member 38, and a bottom horizontal member 40, each of which may be oriented laterally with respect to a fore-and-aft axis 24 defined by the work machine 10. The vertical member 38 may be positioned between and coupled to the top horizontal member 36 and the bottom horizontal member 40. A top portion of the vertical member 38 may be coupled to a front portion of the top horizontal member 36, while a bottom portion of the vertical member 38 may be coupled to a front portion of the bottom horizontal member 40. In combination, the top horizontal member 36, the vertical member 38, and the bottom horizontal member 40 may define a backwards facing "U-shape" when viewed from a side of the work machine 10.

The attachment frame 16 may include a left alignment tab 42 and a right alignment tab 44. The left alignment tab 42 may be coupled to a left portion of the vertical member 38 and extend rearwards and laterally leftwards therefrom. The right alignment tab 44 may be coupled to a right portion of the vertical member 38 and extend rearwards and laterally rightwards therefrom. A left side surface and a front surface of the support frame 26 may define a front left vertical edge 46, while a right side surface and the front surface may define a front right vertical edge 48. A lateral horizontal distance 47 between a tip 50 of the left alignment tab 42 and a tip 52 of the right alignment tab 44 may be greater than a lateral horizontal distance 49 between the vertical edges 46, 48, so as to aid in guiding the attachment adapter 14 into the attachment frame 16 when engaging into the engaged mode.

When in the engaged mode, the top horizontal member 36 may be positioned above the support frame 26, the vertical member 38 may be positioned in front of the support frame 26, and the bottom horizontal member 40 may be positioned below the support frame 26.

In some embodiments, the attachment frame 16 may include a first attachment point 28 and a second attachment point 30. The first and second attachment points 28, 30 engage, into an engaged mode, with the attachment adapter 14 when the work machine 10 is raised to a raised position. And the first and second attachment points 28, 30 disengage, into a disengaged mode, from the attachment adapter 14 when the work machine 10 is lowered into a lowered position. The top horizontal member 36 may be a longitudinal member, and it may define the first and second attachment points 28, 30.

The first upwardly projecting member 20 may be positioned laterally leftwards relative to a front portion of the work machine 10, such that an operator thereof can see the first upwardly projecting member 20 when in the engaged mode. The second upwardly projecting member 22 may be positioned laterally rightwards relative to the front portion of the work machine 10, such that the operator can see the second upwardly projecting member 22 when in the engaged mode. Such a line of sight to the first and second upwardly projecting members 20, 22 may help the operator know that the weight 19, for example, is engaged for use with the work machine 10.

As shown in FIGS. 4-5, the attachment assembly 12 may include a retaining pin 62. The top horizontal member 36 may include a top retaining aperture 64. Further, the bottom horizontal member 40 may include a bottom retaining aperture 66, and the support frame 26 may include a support frame retaining aperture 68. Still further, the attachment adapter 14 may include an adapter aperture 65. The retaining pin 62 may be positioned in the top retaining aperture 64, the bottom retaining aperture 66, the support frame retaining aperture 68, and the adapter aperture 65. The retaining pin 62 locks the attachment frame 16 to the attachment adapter 14. Thus, even if the work machine 10 travels over a large bump or the weight 19 hits the ground, the attachment frame 16 and the weight 19 will stay attached to the work machine 10.

As also shown in FIGS. 4-5, some embodiments of the attachment assembly 12 may further include a bushing 70. The retaining pin 62 may be positioned in the bushing 70, and the bushing 70 may constrained into a vertical position between a top surface of the bottom horizontal member 40 and a bottom surface of the support frame 26. The bushing 70 restricts the vertical movement of the attachment frame 16 relative to the attachment adapter 14.

As shown in FIGS. 6-9, some embodiments of the attachment assembly 12 may include a rotator assembly 72 coupled to the attachment frame 16 about a lateral rotation axis 74. The rotator assembly 72 may include a rotator aperture 76. The rotator assembly 72 may include a first plate 78 and a second plate 80 coupled for rotation therewith. The first plate 78 may include the rotator aperture 76, and the second plate 80 may include a flat wall 92 and an obstruction bowl 94.

The rotator assembly 72 may further include a hinge 84 and a pin 86. A first portion 88 of the hinge 84 may be rigidly coupled to the bottom horizontal member 40, and a second portion 90 of the hinge 84 may be rigidly coupled to the first plate 78. The pin 86 may be positioned in the first and second portions 88, 90.

Figure 6:
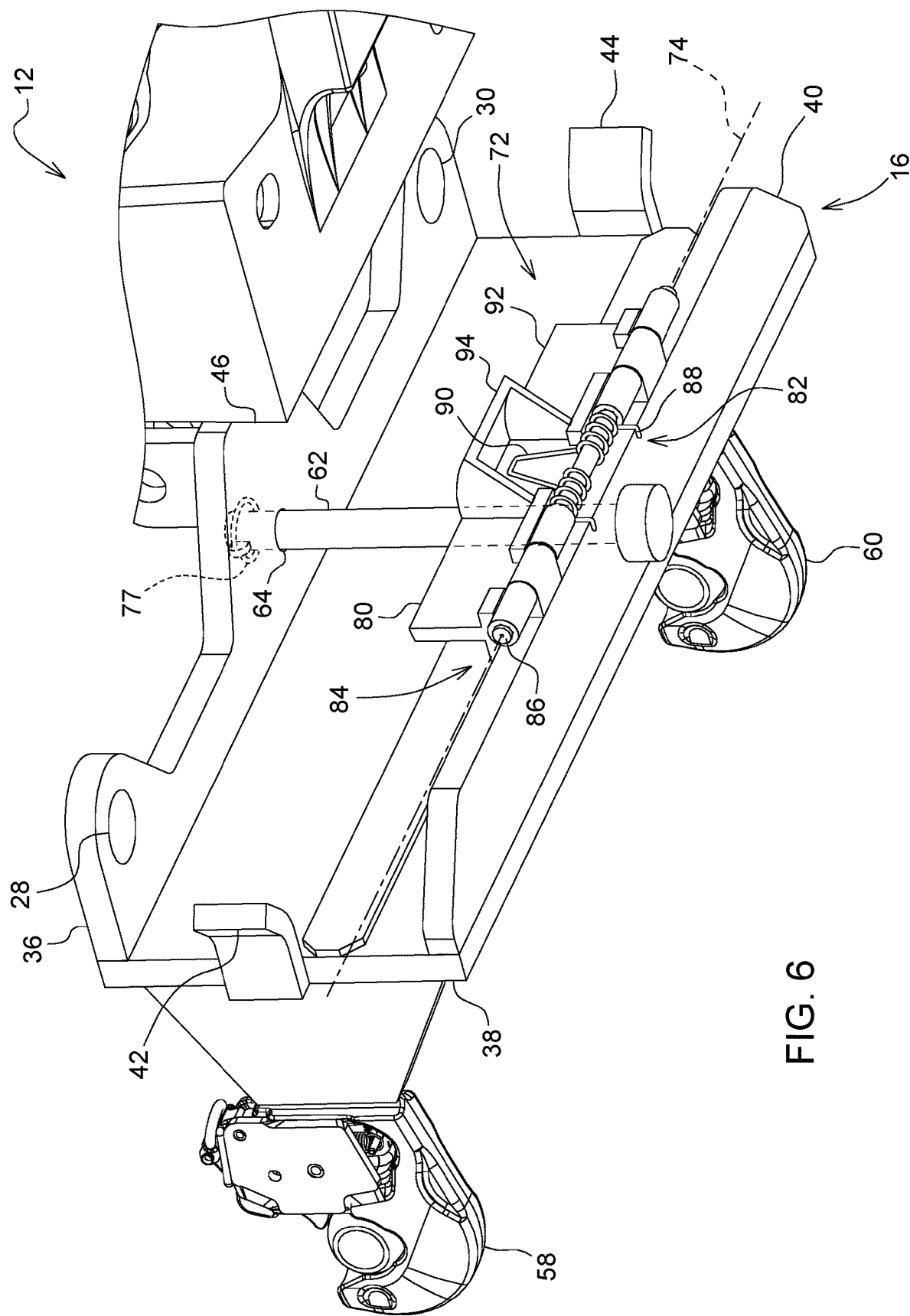
FIG. 6 is a bottom perspective view of the attachment assembly.
Figure 7:
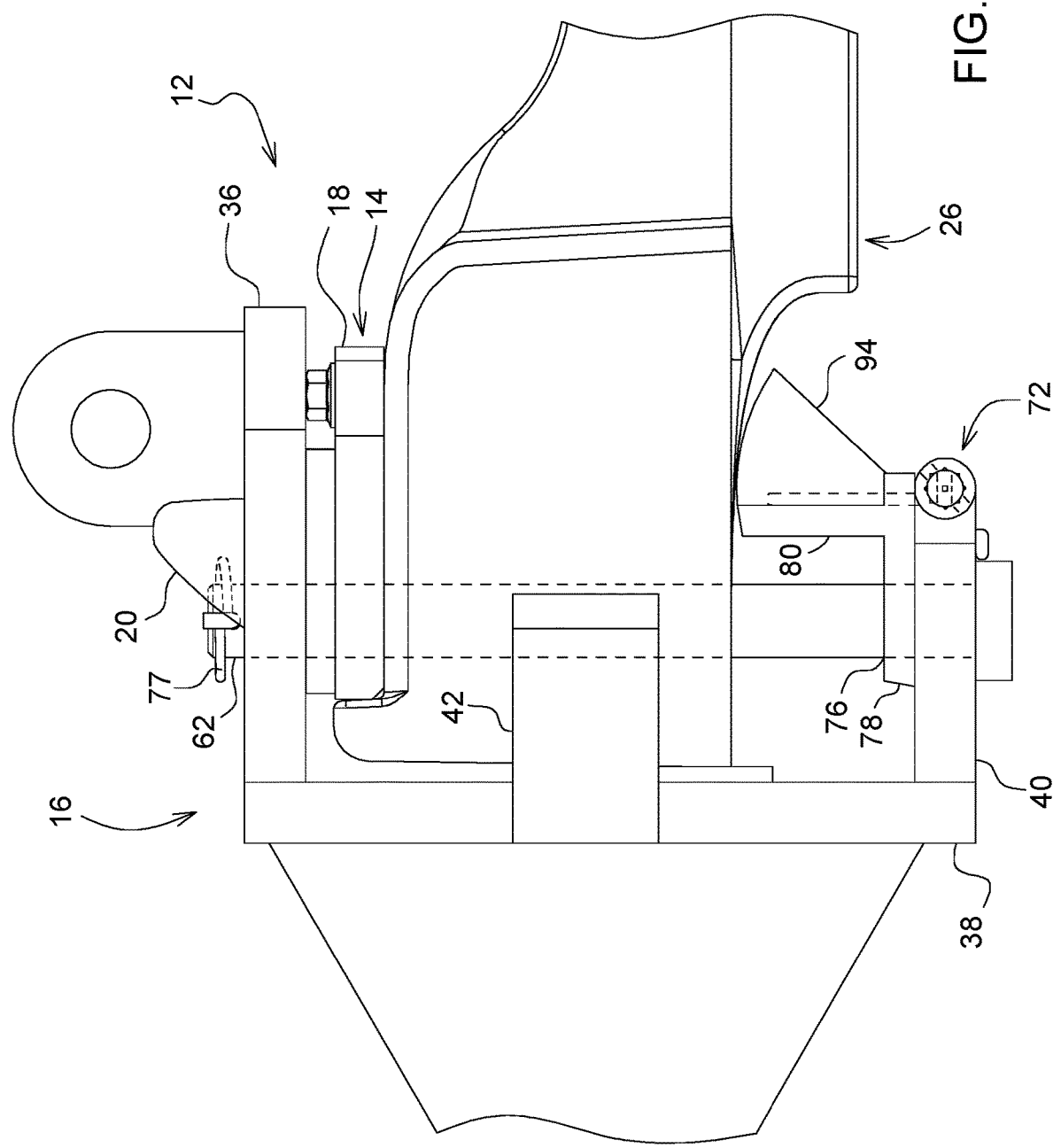
FIG. 7 is left side elevational view of the attachment assembly and the support frame, showing a rotator assembly in a locked mode.

In FIGS. 6-7, the rotator assembly 72 is shown in a locked mode. In the locked mode, the second plate 80 may be vertically locked into position between a top surface of the bottom horizontal member 40 and a bottom surface of the support frame 26. In addition, in the locked mode, the retaining pin 62 may be positioned in the rotator aperture 76, the top retaining aperture 64, the bottom retaining aperture 66, and the support frame retaining aperture 68. As shown in FIGS. 6-7, the second plate 80 restricts the vertical movement of the attachment frame 16 relative to the attachment adapter 14, and the retaining pin 62 locks the attachment frame 16 to the attachment adapter 14.

Referring specifically to FIG. 6, the rotator assembly 72 may include a biasing element 82, in which a first portion 88 thereof is in contact with the bottom horizontal member 40, and a second portion 90 is in contact with the second plate 80. The biasing element 82 is positioned, so as to urge the rotator assembly 72 about the lateral rotation axis 74 and towards the locked mode.

Figure 8:
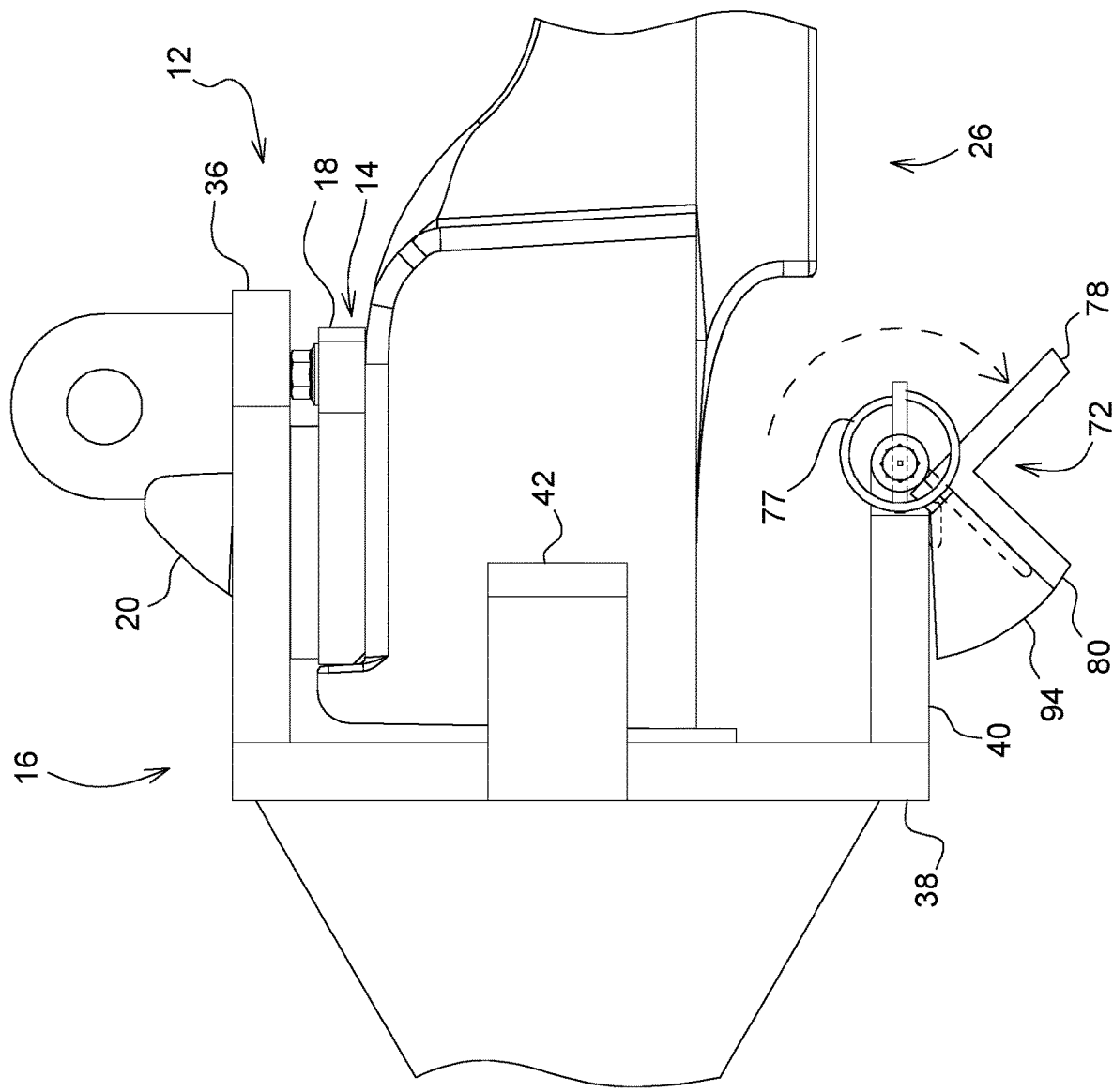
FIG. 8 is a left side elevational view of the attachment assembly and the support frame, showing the rotator assembly in an obstruction mode.
Figure 9:
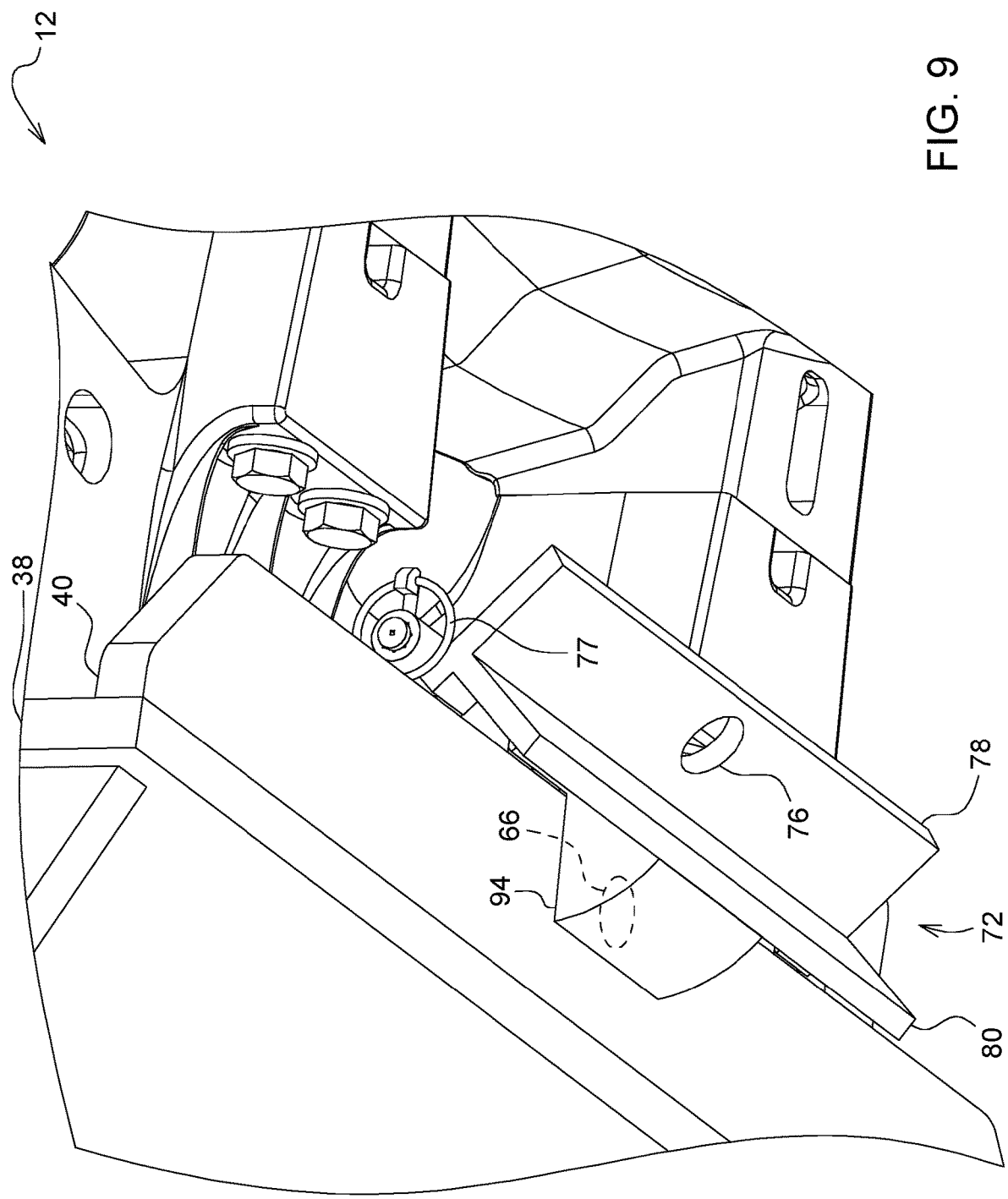
FIG. 9 is a bottom perspective view of the attachment assembly and the support frame, showing the rotator assembly in an obstruction mode.

In FIGS. 8-9, the rotator assembly 72 is in an obstruction mode. In this mode, the obstruction bowl 94 obstructs the retaining pin 62 from being fully seated against the top horizontal member 36 and prevents the operator from inserting, for example, a locking key 77 into an end of the retaining pin 62. This reminds the operator to have the rotator assembly 72, in the locked mode, when installing the retaining pin 62.

When the locking key 77 is not in the end of the retaining pin 62, it may be used to counteract the biasing element 82 and to retain the rotator assembly 72 in the obstruction mode. To provide this counteracting force, the locking key 77 may be inserted into an aperture of the hinge 84 and also into an aperture in the pin 86. The pin 86 may be welded into place, such that it does not rotate and thus assists, in combination with locking 77, in counteracting the biasing element 82. Counteracting the biasing element 82 may be needed when engaging the attachment adapter 14 with the attachment frame 16 and vice-versa.

Figure 10:
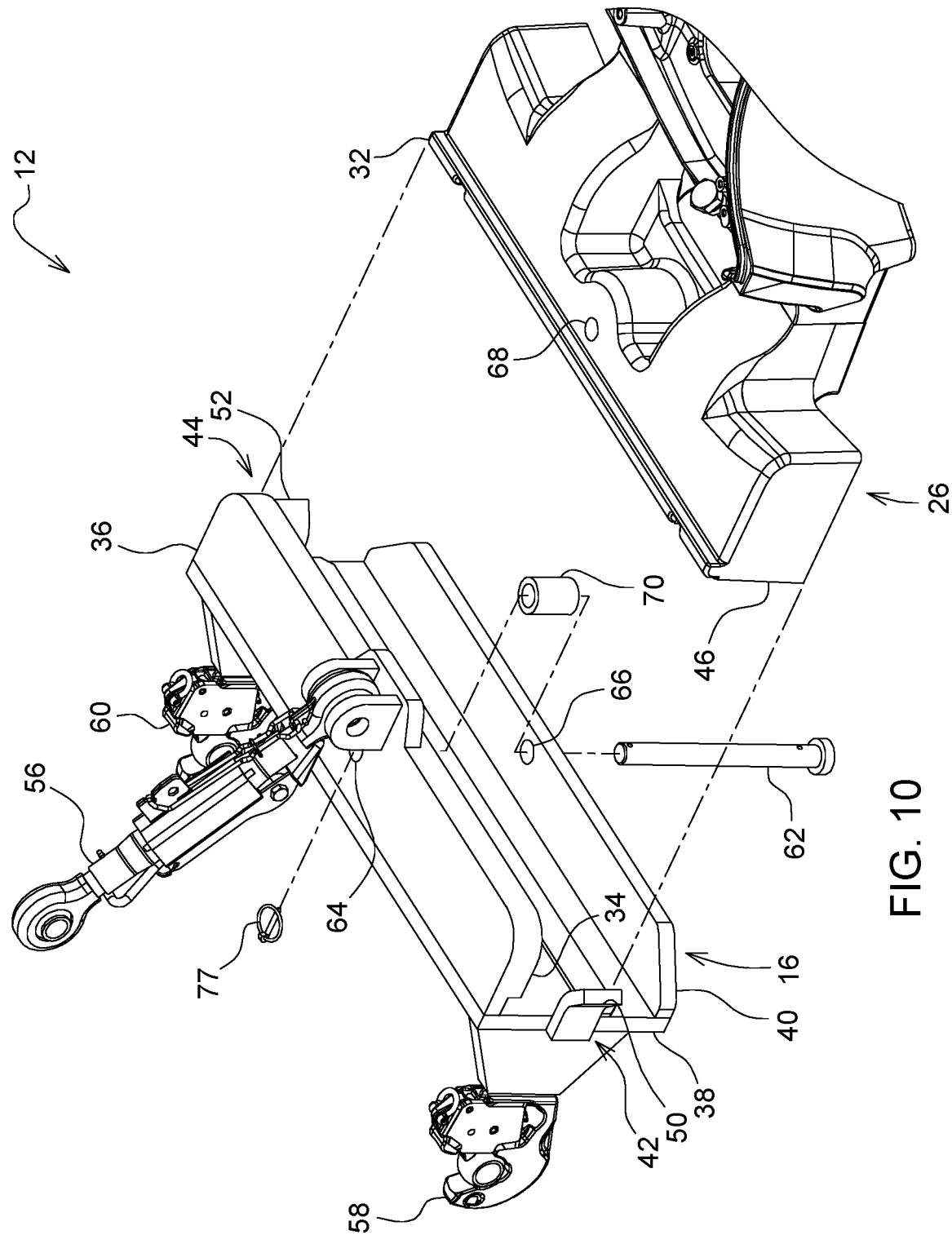
FIG. 10 is an exploded perspective view of an alternative example of an attachment assembly, showing an upwardly projecting lip and a downwardly projecting lip.

Shown in FIG. 10 is an alternative embodiment of the attachment assembly 12. In this embodiment, the attachment adapter 14 may include an upwardly projecting lip 32 positioned along a top surface of a support frame 26 of the work machine 10, while the attachment point may be a downwardly projecting lip 34 positioned along a bottom surface of the top horizontal member 36. The upwardly projecting lip 32 and the downwardly projecting lip 34 may be oriented laterally with respect to the fore-and-aft axis 24. The upwardly projecting lip 32 and the downwardly projecting lip 34 engage when in the engaged mode.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

What is claimed is:

1. An attachment assembly for use with a work machine, the attachment assembly comprising:
   an attachment adapter coupled to the work machine and fixed relative thereto; and
   an attachment frame comprising a member, the member defining an attachment point configured to engage, into an engaged mode, with the attachment adapter when a front suspension system of the work machine is raised to a raised position, and configured to disengage, into a disengaged mode, from the attachment adapter when the front suspension system is lowered to a lowered position, the attachment adapter configured to travel with the work machine when in the engaged mode and the disengaged mode, and the attachment frame configured to travel with the work machine when in only the engaged mode;
   wherein the attachment adapter includes an upwardly projecting lip positioned along a top surface of a support frame of the work machine, the attachment point includes a downwardly projecting lip positioned along a bottom surface of the member, the upwardly projecting lip and the downwardly projecting lip are oriented laterally with respect to a fore-and-aft axis defined by the work machine, and the upwardly projecting lip and the downwardly projecting lip engage when in the engaged mode;
   wherein the member is a horizontal member oriented laterally with respect to a fore-and-aft axis defined by the work machine, the attachment frame comprises a vertical member coupled to the horizontal member and oriented laterally with respect to the fore-and-aft axis, and the vertical member is configured to be positioned in front of a support frame of the work machine; and
   wherein the attachment frame comprises a left alignment tab coupled to a left portion of the vertical member and a right alignment tab coupled to a right portion of the vertical member, the left alignment tab extends rearwards and laterally leftwards from the vertical member, the right alignment tab extends rearwards and laterally rightwards from the vertical member, a left side surface and a front surface of the support frame define a front left vertical edge, a right side surface and the front surface define a front right vertical edge, a lateral horizontal distance between a tip of the left alignment tab and a tip of the right alignment tab is greater than a lateral horizontal distance between the vertical edges, so as to aid in guiding the attachment adapter into the attachment frame when engaging into the engaged mode.

2. The attachment assembly of claim 1, wherein the attachment adapter comprises a longitudinal horizontal plate oriented laterally with respect to a fore-and-aft axis defined by the work machine, a bottom surface of the longitudinal horizontal plate coupled to the top surface of the support frame of the work machine.

3. The attachment assembly of claim 1, wherein the attachment adapter is coupled to the support frame of the work machine.

4. The attachment assembly of claim 1, wherein the member is a horizontal member oriented laterally with respect to a fore-and-aft axis defined by the work machine.

5. The attachment assembly of claim 1, wherein the attachment adapter and the support frame of the work machine are molded together as a unitary casting.

6. An attachment assembly for use with a work machine, the attachment assembly comprising:
an attachment adapter coupled to the work machine and fixed relative thereto; and
an attachment frame comprising a member, the member defining an attachment point configured to engage, into an engaged mode, with the attachment adapter when a front suspension system of the work machine is raised to a raised position, and configured to disengage, into a disengaged mode, from the attachment adapter when the front suspension system is lowered to a lowered position, the attachment adapter configured to travel with the work machine when in the engaged mode and the disengaged mode, and the attachment frame configured to travel with the work machine when in only the engaged mode;
wherein the attachment adapter includes an upwardly projecting lip positioned along a top surface of a support frame of the work machine, the attachment point includes a downwardly projecting lip positioned along a bottom surface of the member, the upwardly projecting lip and the downwardly projecting lip are oriented laterally with respect to a fore-and-aft axis defined by the work machine, and the upwardly projecting lip and the downwardly projecting lip engage when in the engaged mode;
wherein the member is a horizontal member oriented laterally with respect to a fore-and-aft axis defined by the work machine, the attachment frame comprises a vertical member coupled to the horizontal member and oriented laterally with respect to the fore-and-aft axis, and the vertical member is configured to be positioned in front of a support frame of the work machine; and
wherein the horizontal member is a top horizontal member, the attachment frame comprises a bottom horizontal member oriented laterally with respect to the fore-and-aft axis, the bottom horizontal member is below the top horizontal member and spaced vertically apart from the top horizontal member, a top portion of the vertical member being coupled to a front portion of the top horizontal member, and a bottom portion of the vertical member being coupled to a front portion of a bottom horizontal member.

7. The attachment assembly of claim 6, wherein the top horizontal member, the vertical member, and the bottom horizontal member define a backwards facing "U-shape" when viewed from a side of the work machine.

8. An attachment assembly for use with a work machine, the attachment assembly comprising:
an attachment adapter coupled to the work machine and fixed relative thereto; and
an attachment frame comprising a member, the member defining an attachment point configured to engage, into an engaged mode, with the attachment adapter when a front suspension system of the work machine is raised to a raised position, and configured to disengage, into a disengaged mode, from the attachment adapter when the front suspension system is lowered to a lowered position, the attachment adapter configured to travel with the work machine when in the engaged mode and the disengaged mode, and the attachment frame configured to travel with the work machine when in only the engaged mode;
wherein the attachment adapter includes an upwardly projecting lip positioned along a top surface of a support frame of the work machine, the attachment point includes a downwardly projecting lip positioned along a bottom surface of the member, the upwardly projecting lip and the downwardly projecting lip are oriented laterally with respect to a fore-and-aft axis defined by the work machine, and the upwardly projecting lip and the downwardly projecting lip engage when in the engaged mode; and
wherein the member is a top horizontal member, and the attachment frame further comprises a bottom horizontal member and a vertical member, the vertical member is positioned between and coupled to the top horizontal member and the bottom horizontal member, the top horizontal member is configured to be positioned above a support frame of the work machine when in the engaged mode, the vertical member is configured to be positioned in front of the support frame when in the engaged mode, and the bottom horizontal member is configured to be positioned below the support frame when in the engaged mode.

9. The attachment assembly of claim 8, wherein the attachment frame comprises an upper link, a bottom left link, and a bottom right link, the upper link is rotatably coupled to at least one of the members, and the bottom left link and the bottom right link are rigidly coupled to at least one of the members.

10. The attachment assembly of claim 9, wherein the upper link is rotatably coupled to the top horizontal member, and the bottom left link and the bottom right link are rigidly coupled to the vertical member.

11. The attachment assembly of claim 8, further comprising a retaining pin, wherein the top horizontal member comprises a top retaining aperture, the bottom horizontal member comprises a bottom retaining aperture, the support frame comprises a support frame retaining aperture, and the retaining pin is positioned in the top retaining aperture and the bottom retaining aperture and the support frame retaining aperture.

12. The attachment assembly of claim 11, further comprising a bushing, the retaining pin being positioned in the bushing, and the bushing being constrained into vertical position between a top surface of the bottom horizontal member and a bottom surface of the support frame, so as to restrict a vertical movement of the attachment frame relative to the attachment adapter.

13. The attachment assembly of claim 11, further comprising a rotator assembly coupled to the attachment frame about a lateral rotation axis, the rotator assembly comprising a rotator aperture, the retaining pin is positioned in the rotator aperture, the top retaining aperture, the bottom retaining aperture, and the support frame retaining aperture when the rotator assembly is in a locked mode.

14. The attachment assembly of claim 13, wherein the rotator assembly comprises a first plate and a second plate coupled for rotation therewith, the first plate comprises the rotator aperture, the second plate is locked into position between a top surface of the bottom horizontal member and a bottom surface of the support frame when the rotator assembly is in the locked mode, so as to restrict a vertical movement of the attachment frame relative to the attachment adapter.

15. The attachment assembly of claim 13, wherein the rotator assembly comprises a biasing element, a first portion of the biasing element is in contact with the bottom horizontal member, a second portion of the biasing element is in contact with the second plate, the biasing element being positioned so as to urge the rotator assembly about the lateral rotation axis and towards the locked mode.

16. The attachment assembly of claim 11, further comprising a rotator assembly coupled to the attachment frame about a rotation axis, the rotator assembly comprising a first plate and a second plate coupled perpendicularly relative thereto, the first plate and the second plate rotate in unison, the second plate being positioned below the bottom retaining aperture so as to obstruct the retaining pin from being fully seated against the top horizontal member when the rotator assembly is in an obstruction mode.

17. The attachment assembly of claim 16, wherein the second plate comprises a flat wall and an obstruction bowl positioned thereon, and the obstruction bowl is positioned below the bottom retaining aperture so as to obstruct the retaining pin from being fully seated against the top horizontal member when the rotator assembly is in the obstruction mode.

\* \* \* \* \*